United States Patent [19]

Branca

[11] Patent Number: 4,518,342

[45] Date of Patent: May 21, 1985

[54] APPARATUS FOR FORMING CENTRIFUGED POLES

[75] Inventor: Virgilio Branca, Milan, Italy

[73] Assignee: Somiver s.r.l., Milan, Italy

[21] Appl. No.: 598,588

[22] Filed: Apr. 10, 1984

[30] Foreign Application Priority Data

Apr. 11, 1983 [IT] Italy .................. 20528 A/83

[51] Int. Cl.³ .................. B29C 5/00; B29D 3/00
[52] U.S. Cl. .................................. 425/435
[58] Field of Search .................. 425/425, 426, 435

[56] References Cited

U.S. PATENT DOCUMENTS

| | | | |
|---|---|---|---|
| 2,874,412 | 2/1959 | Flemming et al. | 425/435 X |
| 3,738,786 | 6/1973 | Van Buren | 425/435 X |
| 3,768,943 | 10/1973 | Maihart | 425/435 X |
| 3,945,782 | 3/1976 | Farahar | 425/435 X |
| 4,026,335 | 5/1977 | Willemsen | 425/435 X |
| 4,084,782 | 4/1978 | Okada | 425/435 X |

Primary Examiner—J. Howard Flint, Jr.
Attorney, Agent, or Firm—Cushman, Darby & Cushman

[57] ABSTRACT

The present invention relates to an apparatus for forming centrifuged poles made of high-strength resin, which apparatus features a rotary mould in which the resin is spread on a support made of felt or the like, heating means being provided in proximity to the mould, characterized by the fact that, in its interior, said mould has guide means for guiding a delivery head which delivers said material, which head is movable to and fro and is connected by means of a hose to a resin feeding apparatus located outside the mould.

• 8 Claims, 3 Drawing Figures

APPARATUS FOR FORMING CENTRIFUGED POLES

The present invention relates to an apparatus which, by centrifuging material in moulds, forms high-strength poles, for example made of resin.

Poles of such type are currently formed in rotary moulds by high-speed centrifugation of resins, which are subsequently given heat treatments.

The resins are introduced into the interior of the moulds by, for example, pouring them in at the open ends, and are absorbed by support layers made of felt or fibreglass.

Such a method, however, does not allow the resin to be evenly distributed, and thus the strength of the poles formed is variable.

Attempts have been made to obviate this problem by delivering the resin to a tube passing into the interior of the mould and featuring a longitudinal slot, for distribution purposes, at least as long as the entire length of the mould itself. The said device, however, since it delivers a not readily controllable quantity of resin, makes it impossible for the felt support to absorb the resin evenly, and thus areas of lesser or greater thickness are created.

The principal object of the present invention is to embody an apparatus for the formation of poles such as makes it possible to obtain a uniform thickness, a perfectly even distribution of the resins and thus poles with high mechanical strength.

Another object of the invention is to embody an apparatus which allows the centrifuged pole formed to be readily removed from the mould. To achieve said objects, the present invention embodies an apparatus for forming centrifuged poles made of high-strength resin in which, in a rotary mould, the resin is spread on a support made of felt or the like, heating means being provided in proximity to the mould, characterized by the fact that in its interior said mould has guide means for guiding a resin-delivery head which is movable to and fro and which is connected by a tube to a resin feed apparatus located outside the mould.

The structural and functional characteristics and the advantages of an apparatus for forming centrifuged poles according to the invention will be more fully understood from the following description of a non-restrictive example of embodiment referred to the attached schematic drawings, in which.

With reference to the drawings, an apparatus for forming centrifuged poles according to the invention indicated overall by 10, comprises a mould 11 rotatably supported on a series of blocks 12.

At the end of said mould 11 the truncated cone portion is secured to a pulley 13 adapted to transmit the movement imparted by a drive means 14.

Figure 1:
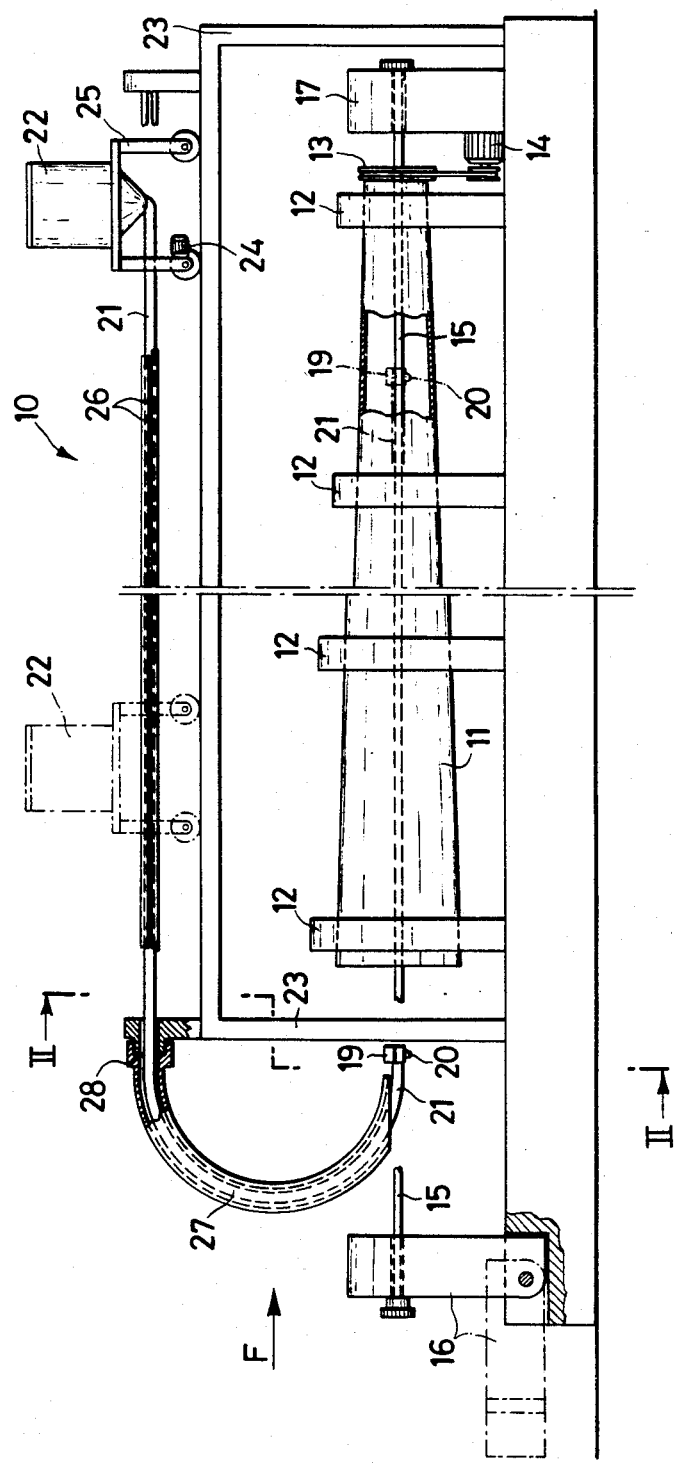
FIG. 1 is an elevational view of the apparatus in the resting position and, where there are dashed and dotted lines, in an intermediate operating position.
Figure 2:
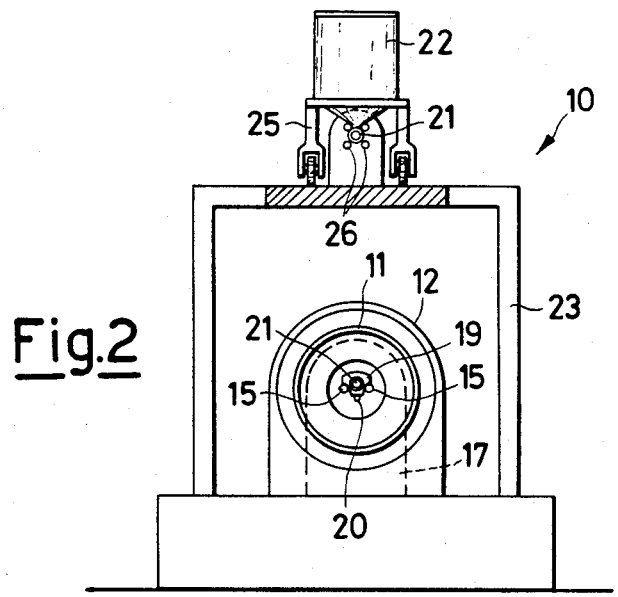
FIG. 2 is a section taken through the line II—II of FIG. 1.
Figure 3:
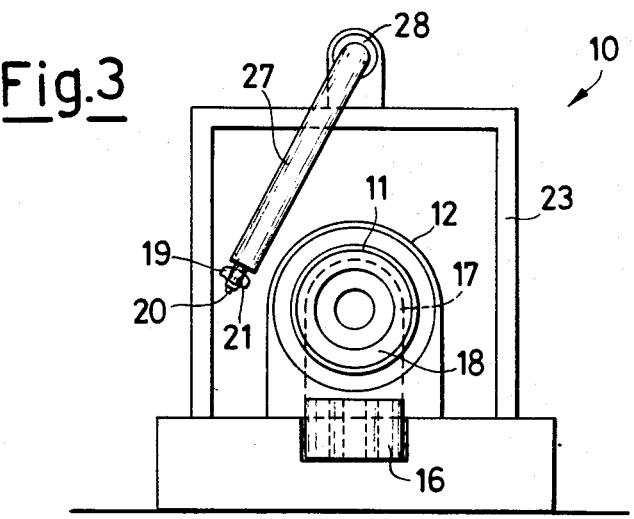
FIG. 3 is a lateral elevational view in the direction F of FIG. 1 of the said apparatus, the removal position of the finished pole being indicated by dotted and dashed line.

Two guide rods 15, made for example of fibreglass, traverse the entire length of the mould 11, and are supported at their ends on two bases 16 and 17, the first pivoted and horizontally lowerable during the removal of the pole 18 when this has been formed (position indicated by dotted and dashed line in FIG. 1).

On the two guide rods 15 there is guided a head 19 carrying a delivery device 20 fed by a flexible hose 21 which is connected at its other end to a pressurized container 22 containing the resin.

A framework 23 supports runways of length not less than that of the mould, on which runways the container 22 is caused to translate by means of a motor 24 mounted on a carriage 25 which carries the said container.

The hose 21 is guided by four rods 26, supported at their ends, which send it towards a semicircular, 180° angled branch 27 until it is in proximity to the underlying guide rods 15.

Said semicircular guide branch 17 can be made to rotate about its upper end 28 in proximity to a guide rod support 26.

Heating means are provided for in proximity to the mould 11, which accelerate polymerization during the process of centrifugation.

The manner of operation of an apparatus for forming centrifuged poles according to the invention is as described below:

at the start of each forming operation the apparatus 10 is disposed as shown in FIG. 1; more exactly, within the mould 11 there is pre-laid in known manner a low-thickness support made of felt or fibreglass over the entire surface of the said mould (not shown in the Figure), adapted to absorb the resin.

The carriage 25 carrying the container 22 is positioned in the end position as shown in FIG. 1, with the delivery device 20 still outside the mould 11 and positioned on the guide rods 15.

When the drive means 14 is actuated, the mould 11 supported on the blocks 12 is brought into rotation and at the same time the motor 24 of the carriage 25 is started up and thrusts the hose 21 and relative delivery device 20 into the interior of the mould.

This movement is automatically reversed at the end of the mould 11 and the repetition of a series of to and fro runs of the delivery device 20 allows the resin to penetrate the support felting.

It is readily demonstrable that in order to obtain centrifuged hollow truncated cone pole of constant thickness, the velocity of entry and exit of the delivery device within the mould increased and decreases according to a linear law.

This make it possible to obtain a perfect distribution of the resin and prevents the resin from running on the felt support which would be the case if there were any difficulties of penetrating the said support.

When the quantity of resin required for forming the pole is wholly delivered and the heating means and centrifugation have formed the pole 18 to perfection, the pole must be removed.

After stopping the drive means 14, the guide rods 15 are removed by sliding them out from the bases 16 and 17, the base 16 is lowered horizontally (to the position indicated by the dashed and dotted line in FIG. 1) and the semicircular branch 27 is caused to rotate about its upper end 28 until the hose 21 and the head 19 carrying the delivery device 20 are moved from the outlet end of the mould 11.

Thrusting means, not illustrated, expel the formed pole from the mould 11, and the pole is immediately afterwards evacuated by known means. A fresh re-positioning of the felt support inside the mould, plus re-positioning of the branch 27, the base 16 and the guide rods 15 allows the apparatus to be made ready for a new cycle.

The pressurized container 22 provides a resin delivery which can be held to be essentially constant for at least each run.

I claim:

1. An apparatus for forming poles made of high-strength resin, in which, in a rotary mould, the resin is spread over a support made of felt or the like, provision being made for heating means in proximity to the mould, characterized by the fact that in the interior of said mould there are guide means for guiding a resin-delivery head which is movable to and fro and connected by a hose to a resin feed apparatus positioned outside the mould.

2. An apparatus according to claim 1, characterized by the fact that said guide means are rods positioned at their ends on bases on which said delivery head runs, said rods being freely removable.

3. An apparatus according to claim 1, characterized by the fact that said feed apparatus is a container positioned on a carriage and with actuating means.

4. An apparatus according to claim 1, characterized by the fact that said mould is supported by a series of blocks.

5. An apparatus according to claim 3, characterized by the fact that said carriage is movable on runways positioned on a frame and above said mould and that said hose is flexible and runs in said upper part supported within four guide rods.

6. An apparatus according to claim 5, characterized by the fact that said flexible hose is connected up between the four upper guide rods and the lower guide means by a semicircular branch, rotatable about the axis passing through the centre of the four rods coaxial therewith.

7. An apparatus according to claim 3, characterized by the fact that said container is pressurized.

8. An apparatus according to claim 3, characterized by the fact that said carriage translation means is a motor acting on at least one axle thereof.

* * * * *